Sept. 4, 1956 R. K. SPEAR 2,761,656
AIR CONDITIONING
Filed Aug. 25, 1952
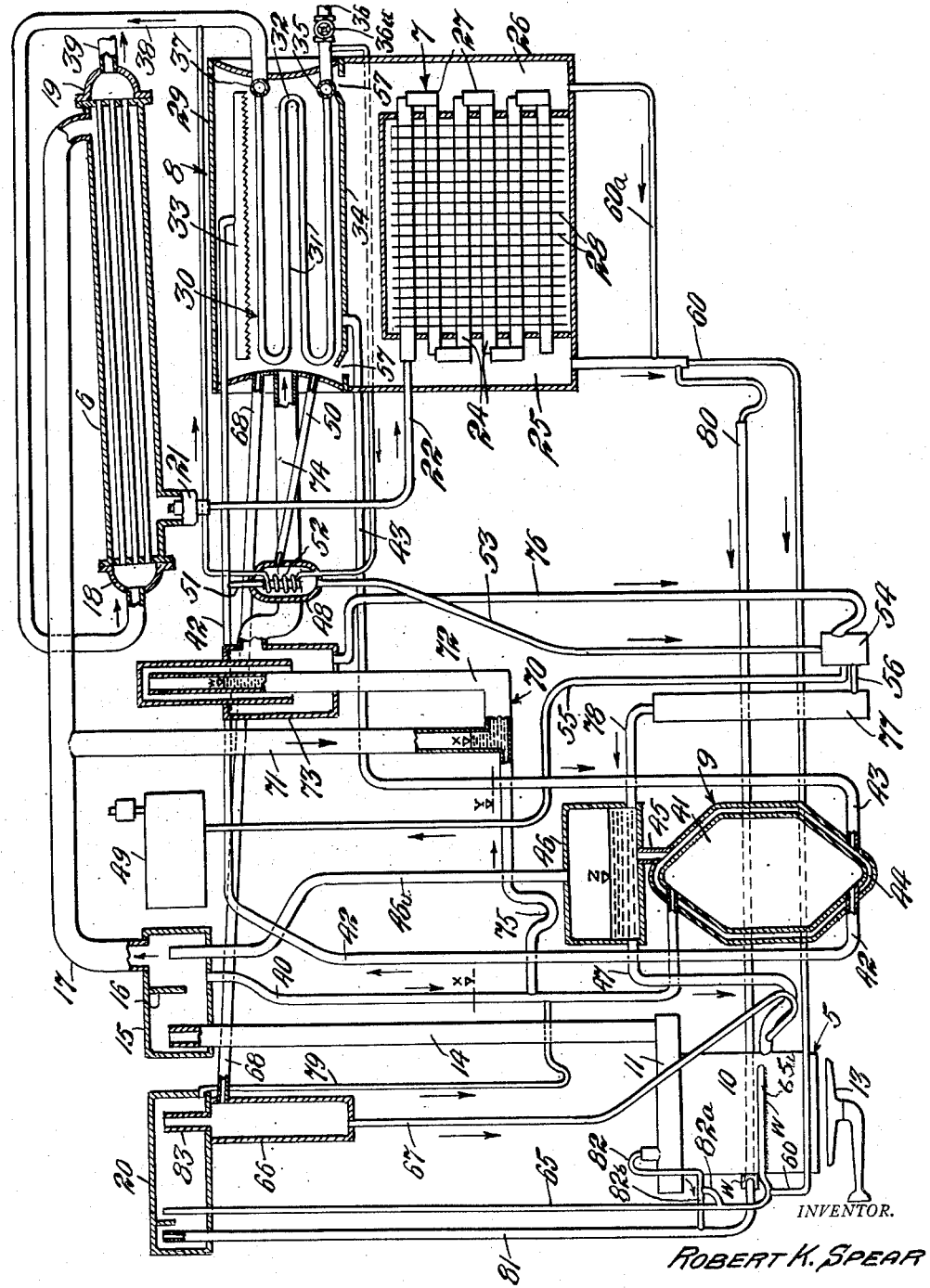
INVENTOR.
ROBERT K. SPEAR
BY
J. L. Kelly
ATTORNEY

United States Patent Office 2,761,656
Patented Sept. 4, 1956

2,761,656

AIR CONDITIONING

Robert K. Spear, Evansville, Ind., assignor to Servel, Inc., New York, N. Y., a corporation of Delaware Application August 25, 1952, Serial No. 306,244

5 Claims. (Cl. 257—9)

This invention relates to vapor liquid-lift pumps, that is to lift pumps of the type wherein a part of the liquid being lifted is heated and vaporized to supply vapor for lifting the remaining liquid.

This invention is particularly concerned with the lifting of variable quantities of liquid in a steady and efficient manner.

Among other uses, the invention has application with absorption refrigerating systems of the two pressure gravity flow type wherein the evaporator is located below the level of the absorber of such systems and wherein under certain conditions of operation variable quantities of liquid refrigerant pass through the evaporator without being evaporated and which liquid refrigerant must be lifted to a higher level, either to a concentration control vessel, to a dilution vessel or to a point in an absorption solution circuit from whence the liquid is returned by gravity to the generator of such refrigerating system.

This invention has particular application with heating and cooling systems wherein the evaporator of an absorption refregerating system of the above type is used as a heat exchanger for both heating and cooling. During cooling cycles of operation of such a system, refrigerant vapor is expelled from a refrigerant-absorbent solution in the generator, condensed to liquid in the condenser and the liquid refrigerant is vaporized in the evaporator to produce the desired cooling effect. Also during cooling cycles of operation variable quantities of liquid refrigerant may overflow the evaporator and such liquid must be lifted from the bottom of the evaporator to a higher elevation, as described above. Whereas, during the heating cycles of operation refrigerant vapor expelled from solution in the generator is condensed in the evaporator to produce the desired heating effect and the condensate produced thereby must be lifted to an elevation from whence such condensate flows by gravity to the generator, either directly or through an absorption solution circuit.

It will be appreciated that with a heating and cooling system of the above type not only will the rate of flow of unevaporated refrigerant from the evaporator vary according to operating conditions during cooling cycles of operation, but the rate of flow of condensate (liquid refrigerant) from the evaporator will also vary during heating cycles of operation. Generally speaking, the rate of flow of unevaporated refrigerant from the evaporator during cooling cycles is much less than the rate of flow of condensates from the evaporator during heating cycles. It will therefore be seen that the design of a practical and efficient pump of the above type presents a problem, which, so far as I am aware, has not herefore been solved.

In its broad aspect, an object of this invention is to provide a vapor liquid-lift pump for lifting liquid to a higher level from a source fed by varying rates of flow. In a more specific aspect, an object of this invention is to provide a vapor liquid-lift pump for use with a heating and cooling system wherein the evaporator of a two pressure absorption type refrigerating apparatus functions as a heat exchanger for both heating and cooling, and where-in the evaporator is located below the absorber of such apparatus.

Briefly, in accordance with this invention my improved vapor liquid-lift pump comprises a first and a second feed conduit each connected at one end to the bottom of an evaporator or heat exchanger of an absorption refrigerating system and each connected at its opposite end to a first and a second lift tube, respectively. The bottom portion of each of the lift tubes is provided with a vaporizing section placed in thermal contact and heated by the generator of the refrigerating system. The upper ends of the lift tubes are connected to a receiving vessel. The lower portion of each of the lift tubes is connected by a small conduit to a vapor space of the generator of the refrigerating system. The first feed conduit is of smaller cross sectional area than the second and the vaporizing section of the first lift tube constitutes a horizontal dead end tube.

The arrangement is such that overflow liquid from the bottom of the evaporator flows first through the first feed conduit into the first lift tube. When the liquid reaches the vaporizing section, the dead end section, of the first lift tube, part of the liquid is vaporized. The vapor thus produced pumps the remaining liquid up the first lift tube into the receiving vessel. If excess vapor is formed, the vaporizing section of the first lift tube becomes filled with vapor and stops liquid flow thereinto; conversely, if enough vapor is not formed, more liquid flows from the first feed conduit into the vaporizing section of the first lift tube for additional vapor formation. In this manner a balance is automatically attained between vapor formation in the first vaporizing section and liquid pumped in the first lift tube. Should the rate of liquid flow from the bottom of the evaporator be greater than the capacity of the first feed conduit, liquid will then flow into and through the second feed conduit to the vaporizing section of the second lift tube wherein part of this liquid is vaporized and the vapor produced thereby lifts the remaining liquid up the second lift tube into the receiving vessel. The conduit connection between the vapor space of the generator and the lower portion of each of the first and second lift tubes is primarily to prevent superheating of the liquid in the bottom of the lift tubes. Also, this connection permits gravity drainage of liquid from the bottom of the evaporator to the generator during off cycles.

The invention, together with the above and other objects and advantages thereof, will be better understood from the following description taken in connection with the accompanying drawings in which the single figure illustrates more or less diagrammatically a heating and cooling system embodying the invention.

For purpose of illustration, the present invention is incorporated in a heating and cooling system generally like that disclosed in Fig. 2 of an application Serial No. 306,243 of P. P. Anderson, Jr., and E. M. Stubblefield, filed concurrently herewith. An absorption refrigerating system of the above type operates under a partial vacuum, it is hermetically sealed, evacuated of all air and other gases and is charged with a water solution of a salt such as lithium bromide, or the like. Water, constituting the refrigerant, is expelled from solution by the application of heat to the generator and the concentrated salt solution from which the water has been expelled constitutes the absorbent. In order to meet varying conditions, such as changes in cooling water temperature during cooling operation, it is desirable that the concentration of the absorption solution be varied. That is, with high cooling water temperatures, the solution should be rather concentrated and with low cooling water temperatures the solution should be somewhat dilute. However, when a system of this type is operating on a heating cycle, it is desirable that the refrigerant-absorbent solution in the active circuit be dilute at all times. A dilute solution not only boils more readily at the beginning of a cycle of operation, it also permits the generator to operate at lower temperatures during heating cycles of operation than would be possible if a solution of the same concentration be circulated through the active circuit on both heating and cooling cycles. The disclosure in the aforementioned Anderson and Stubblefield application may be considered as being incorporated in this application, and, if desired, reference may be made thereto for a detailed description of the heating and cooling system.

Referring to the drawing, the heating and cooling system includes a generator 5, a condenser 6, an evaporator or heat exchanger 7, an absorber 8 and a liquid heat exchanger 9 interconnected for the circulation of refrigerant and absorbent. The generator 5 comprises a vertically arranged cylindrical vessel 10 closed at both ends and having a vapor dome or chamber 11 located at the top thereof. A plurality of flues, not shown, extend axially of the generator vessel 10 through which the products of combustion from a gas burner 13 flow to heat the solution. The lower end of a vertical vapor liquid-lift tube 14 projects into the vapor dome 11 and a separating chamber 15 surrounds and encloses the upper end of the lift conduit. Baffles 16 in the separating chamber 15 separate the refrigerant vapor from solution issuing from the upper end of the lift conduit.

A vapor pipe 17 connects the separating chamber 15 to the condenser 6. The condenser 6 comprises a conventional shell forming a chamber with water tubes extending therethrough between headers 18 and 19. Liquid refrigerant condensed in condenser 6 flows to the evaporator 7 through a conduit 22. A device 21 in conduit 22 has an orifice therein for permitting the flow of liquid refrigerant and non-condensable gases while maintaining the difference in pressure between the condenser and evaporator.

The evaporator 7 comprises a series of tubes 24 arranged one over the other with their ends extending into spaced headers 25 and 26. Cups 27, mounted at the ends of alternate tubes of each row in the respective headers 25 and 26, underlie the end of the next uppermost tube so that refrigerant flows by gravity through successive tubes from the top to the bottom of the evaporator. The headers 25 and 26 are connected to deliver refrigerant vapor from the evaporator tubes 24 to the absorber 8. Heat transfer fins 28 are arranged in spaced relation on the evaporator tubes 24 and during cooling cycles, air or other media to be cooled flows over the tubes and between the fins.

The absorber 8 comprises a shell 29 enclosing a serpentine coil or series of coils 30 arranged in parallel. Each coil 30 comprises a plurality of straight tube sections 31 arranged one over the other in a vertical plane with the ends of the alternate tubes connected by elbows 32 to provide a continuous serpentine coil. Overlying the serpentine coil 30 or plurality of such coils is a liquid distributor 33. Underlying the coils 30 is a tray 34 for collecting absorption solution dripping from the coils. The lower or inlet ends of the coils 30 are connected by a header 35 and the header, in turn, is connected by a conduit 36 to a supply of cooling water. The conduit 36 is provided with a valve 36a for controlling the flow of water therethrough. The upper or outlet ends of the coils 30 are connected by a header 37 which, in turn, is connected by a conduit 38 to the header 18 of the condenser 6.

During cooling cycle operation absorption solution weak in refrigerant is delivered from the separating chamber 15 to the liquid distributor 33 in the absorber 8 through a path of flow comprising a conduit 40, an inner passage 41 of the liquid heat exchanger 9 and a conduit 42. Absorption solution strong in refrigerant flows from the tray 34 at the bottom of the absorber 8 to the generator 5 in a path of flow comprising a conduit 43, an outer passage 44 of the liquid heat exchanger 9, a conduit 45, a leveling vessel 46, and a conduit 47. A vent conduit 46a connects the leveling vessel 46 to the separating chamber 15. During cooling cycles of operation of the system solution will stand at some level x in conduit 40 connected to conduit 42 through the liquid heat exchanger 9, at a level y in conduit 43, and at a level z in the leveling chamber 46.

A purge device 48 is provided for continually withdrawing surplus non-condensable gases from the system and transferring them to a storage vessel 49. The purge device 48 comprises an auxiliary absorber vessel connected to the main absorber 8 through a suction tube 50. The purge device 48 has a connection 51 to conduit 42 for supplying absorption solution weak in refrigerant thereto, a cooling coil 52 therein connected between the conduits 36 and 38 and a fall tube 53 depending from the bottom thereof. A separating chamber or gas trap 54 receives the lower end of the fall tube 53 and is connected by a riser 55 to the gas storage vessel 49 and by a conduit 56 to the absorption solution circuit.

In accordance with this invention, the evaporator 7 located below the absorber 8 and the headers 25 and 26 are connected through openings 57 to the bottom of the absorber shell 29. An evaporator drain means comprises a depending U-shaped conduit 60 having its inlet end connected to the bottom of the evaporator headers 25 and its outlet end connected to the bottom of a first auxiliary vapor liquid-lift tube 65. A branch conduit 60a connects the bottom of the evaporator header 26 to the down leg of conduit 60. The lower end of vapor lift tube 65 is provided with a horizontal dead end portion 65a that is welded or otherwise secured in thermal contact with the shell 10 of the generator to be heated thereby, as indicated at W. A branch conduit 80, to be described in more detail hereinafter, leads from the drain conduit 60 to a second auxiliary vapor liquid-lift tube 81. The outlet end of conduit 80 is heated by thermal contact with the generator shell 10 to which it is welded, as indicated at W. To prevent surging of liquid in the conduits 60 and 80, each of these conduits is provided with an orifice, not shown.

A vapor conduit 82, provided with branches 82a and 82b, each having an orifice therein not shown, connects the vapor dome 11 with the vapor lift tubes 65 and 81, respectively. The vapor conduit 82 and branches 82a and 82b provide for a limited flow of vapor from the dome 11 into the vapor lifts 65 and 81, which vapor promotes boiling and reduces superheating of the liquid refrigerant in the vapor lifts 65 and 81. Also the conduit 82 and branches 82a and 82b provide a path of flow for liquid from the evaporator to the generator during off periods. The upper or outlet ends of each of the vapor lifts 65 and 81 extend into a refrigerant storage vessel 20.

The refrigerant storage vessel 20 is connected by a liquid trap 79 to the weak absorption solution line 40 leading from the separating chamber 15 and by an overflow conduit 83 to a concentration control vessel 66. The bottom of the concentration control vessel is connected by a down tube 67 to the conduit 47 leading into the bottom of the generator 5. A vent tube 68 connects the top of the concentration control vessel 66 to the interior of the absorber shell 29.

A vapor by-pass comprises a liquid trap 70 having a down leg 71 connected to the vapor conduit 17 and an up leg 72 projecting into the top of an auxiliary separating chamber 73. A vapor conduit 74 connects the auxiliary separating chamber 73 to the shell 29 of the absorber for flow of vapor to the absorber shell, which vapor flows through the openings 57 into the headers 25 and 26 of the evaporator. Weak absorption solution is fed into the liquid trap 70 from the weak solution conduit 40 through a liquid trap 75. A liquid trap comprising a conduit 76, the gas trap 54, the conduit 56, a vessel 77, and a conduit 78 connects the auxiliary separating chamber 73 to the leveling chamber 46 for flow of weak solution to the leveling chamber during heating cycles of operation and for balancing the pressure between the high and low pressure sides of the system during cooling cycles of operation.

At the beginning of a heating cycle of operation of the system, the valve 36a in the cooling water line 36 is closed, either manually or automatically, so that cooling water does not flow through the absorber or condenser. Now, as the high side pressure rises above the maximum allowed on cooling cycle operations, the trap 70 is blown of liquid and vapor passes from the separating chamber 15, through conduit 17, down leg 71 into and through the trap 70, through the auxiliary vapor separating chamber 73, through conduit 74 into the absorber shell 29, and from there the vapor flows through the openings 57 into the headers 25 and 26 of the evaporator 7, which evaporator now functions as a heating element.

At the same time, weak solution flows from the separating chamber 15 through the upper portion of conduit 40, through the liquid trap 75 into the bottom of the trap 70, through which the solution is carried by means of the flowing vapor through the up leg 72 into the auxiliary separating chamber 73, where the liquid is separated from the generator vapor. Also the liquid refrigerant that has been stored in vessel 20 is dumped through trap 79 into conduit 40, into trap 75, and into trap 70. The liquid refrigerant from the refrigerant reservoir 20 mixes with absorption solution from conduit 40 and the mixture or dilute absorption solution is carried through the up leg 72 into the auxiliary separating vessel 73. The dilute solution flows from the bottom of the auxiliary separating chamber 73 through the conduit 76, gas trap 54, conduit 56, vessel 77, conduit 78, leveling vessel 46 and conduit 47 back to the generator 5.

During heating cycles of operation, absorption solution stands more or less dormant in the lower portion of conduit 40, the inner passage 41 of the liquid heat exchanger, conduit 42, conduit 43, the outer passage 44 of the liquid heat exchanger and conduit 45. Thus, the absorption solution standing in these elements is in effect withdrawn from the active solution circuit during heating cycles of operation and the amount of liquid refrigerant required to dilute the solution in the active circuit is reduced. Furthermore, the liquid refrigerant that is dumped from the storage vessel 20 is mixed only with the solution in the active circuit.

The hot generator vapor that is introduced into the headers 25 and 26 of the evaporator passes into and through the evaporator tubes 24 wherein the vapor is condensed giving up its latent heat of condensation to air or other media that passes over the exterior of the tubes thereby heating such media. The condensate formed in the evaporator tubes 24 flows from the lowermost of said tubes into the header 25 and from there into conduit 60. Any condensate formed in the header 26 of the evaporator flows therefrom through conduit 60a into conduit 60. The condensate flows through conduit 60 into the dead end portion 65a of vapor lift 65. The thermal contact of the dead end portion of vapor lift 65 with the generator shell 10 provides the necessary heating and consequent vaporization of a part of the condensate for lifting the remaining condensate from conduit 60 through vapor lift 65 into the vessel 20. If excess vapor is formed in the dead end portion 65a of vapor lift 65, this portion of the lift becomes filled with vapor and stops liquid flow thereinto; conversely, if enough vapor is not formed, more liquid flows from feed conduit 60 into the vaporizing section 65a for additional vapor formation. In this manner a balance is automatically attained between vapor formation in the vaporizing section 65a and liquid pumped in the lift tube 65.

Vapor lift 65 fed by conduit 60 takes care of normal overflow of liquid refrigerant during cooling cycles. However, during heating cycles of operation, the amount of condensate flowing from the evaporator into conduit 60 is apt to be greater than the capacity of the vapor lift 65, in which case, condensate flows from the down leg of conduit 60 into and through conduit 80 to the vapor lift 81. The vapor required for lifting the condensate from conduit 80 through vapor lift 81 into vessel 20 is provided by the thermal contact of the outlet portion of conduit 80 with the shell 10 of the generator. The lifting vapor passes from vessel 20 through overflow 83 and vent conduit 68 into the absorber shell 29. From vessel 20 the condensate flows through trap 79 into conduit 40 where it mixes with the solution flowing from the separating chamber 15. This mixture of refrigerant and absorption solution, in other words this dilute solution, is returned to the generator 5 through trap 75, trap 70, up leg 72, auxiliary separating chamber 73, conduit 76, gas trap 54, conduit 56, vessel 77, conduit 78, leveling vessel 46 and conduit 47, as described above. It is to be noted that during heating cycle operation the pressure difference between the high and low pressure sides of the system is relatively low and no storage of liquid refrigerant or condensate will occur in vessel 20. Also there will be no overflow of liquid from vessel 20 into the concentration control vessel 66.

To shift from a heating cycle to a cooling cycle of operation all that is necessary is that the control valve 36a in the cooling water line 36 be open for flow of water through the absorber cooling coil and through the condenser cooling tubes, so that the refrigerant vapor flowing from the generator is condensed in the condenser, the pressure in the high side of the system is reduced and the liquid trap 70 is again established. Liquid refrigerant flows from the condenser 6 through conduit 22 into the evaporator 7 wherein the liquid refrigerant is vaporized by extracting heat from air or other media flowing over the evaporator tubes thereby cooling such media. The refrigerant vapor passes from the evaporator through the openings 57 into the absorber wherein the vapor is absorbed by the absorption solution. The strong absorption solution flows from the bottom of the absorber through conduit 43, the outer passage 44 of the liquid heat exchanger, conduit 45, leveling vessel 46 and conduit 47 back to the generator 5.

Assume that the system has been operating on a heating cycle and is now starting on the cooling cycle. Solution lifted into separating chamber 15 by vapor lift 14 will flow through conduit 40 and trap 75 into the by-pass trap 70 providing a suitable liquid column in the up leg 72 for balancing the pressure difference between the high and low pressure sides of the system and for blocking flow of vapor from the separating chamber 15 to the evaporator 7, the solution level in the up leg 72 being at the height w the level at which solution enters the absorber from conduit 42. Trap 79 being in open communication with the low pressure side of the system, solution will also fill this trap to the same height w. Since the solution flowing to the absorber 8 through conduit 42 is dilute, the evaporator temperature will be higher than normal. That is, the liquid refrigerant delivered from the condenser through conduit 22 to the evaporator will not be completely evaporated therein and liquid refrigerant will flow from the lowermost of the tubes 24 into the header 25.

This excess liquid refrigerant flows from the header 25 through conduit 60 into the auxiliary vapor lift 65 through which it is lifted into the storage vessel 20, where it is held in storage. The liquid refrigerant held in storage in vessel 20 is lighter than the solution in traps 70 and 79, so that the liquid refrigerant cannot displace the solution in the trap 79 and it remains in the storage vessel. When the storage vessel is filled, any liquid refrigerant delivered thereto will overflow through the conduit 83 into the concentration control vessel 66. The liquid refrigerant delivered to vessel 20 is held in storage during cooling cycle operation and during shut-down periods between cooling cycle operations. This stored refrigerant is dumped back into the active circuit only when the by-pass trap 70 is blown. Since the by-pass 70 is blown whenever the system changes from a cooling to a heating cycle, the liquid refrigerant stored in vessel 20 is dumped back into the active circuit whenever the system changes from cooling to heating.

During cooling cycles of operation, liquid refrigerant introduced into the concentration control vessel 66 will displace any other liquid therein and be temporarily stored as a liquid column of a height to balance the difference in pressure between the absorber 8 and the generator 5. Such storage of liquid refrigerant out of the absorption solution circuit increases the concentration of the absorption solution which, in turn, reduces the vapor pressure and temperature in the evaporator 7 to increase the rate of evaporation therein. The storage of liquid refrigerant in the concentration control vessel 66 continues until all of the refrigerant supplied to the evaporator 7 is evaporated therein. Such a concentration control operates advantageously to compensate for changes in operating conditions such as the cooling water temperature. At high cooling water temperatures the height of the pressure balancing liquid column and the amount of refrigerant stored increases and at low cooling water temperatures the height of the liquid column and amount of refrigerant stored decreases. At the end of a cooling cycle operation, any liquid refrigerant contained in the vessel 66 will drain therefrom through conduit 67 into the vessel 10 of the generator.

Without further description it is thought that the features and advantages of the invention will be readily apparent to those skilled in the art to which this invention appertains, and it will, of course, be understood that changes in form, proportions and minor details of construction may be resorted to without departing from the spirit of the invention and scope of the claims.

What is claimed is:

1. A liquid-lift device comprising means forming a source of liquid to be lifted, a vapor liquid-lift, a feed line connected at one end to said source of liquid and at its opposite end to a lower portion of said vapor lift and a receptacle connected to an upper portion of said vapor lift to receive liquid therefrom, said source of liquid being located above the lower portion of said vapor lift to provide a reaction head between the lower portion of the vapor lift and the source of liquid, said feed line including a first and a second conduit connected to the source of liquid in a manner that liquid flow from the source of liquid into the feed line must exceed the capacity of said first conduit before liquid flows into said second conduit, said vapor lift including a first and a second lift tube each provided with a heat transfer section connected to receive liquid from said first and second conduits, respectively, for vaporizing a portion of the liquid therein to lift the remaining liquid therethrough into the receptacle, said heat transfer section of said first lift tube including a dead end portion connected between the feed line and the lower portion of the vapor lift as to be operable responsive to the amount of vapor produced in said heat transfer section for controlling the flow of liquid into said section and thereby automatically control the extent of the heat transfer section.

2. A liquid lift device as set forth in claim 1 wherein said first and second lift tubes are each provided with means for conveying additional vapor into said tubes.

References Cited in the file of this patent
UNITED STATES PATENTS

| | | |
|---|---|---|
| 2,169,214 | Bergholm | Aug. 15, 1939 |
| 2,311,711 | Thomas | Feb. 23, 1943 |
| 2,331,898 | Kleen | Oct. 19, 1943 |
| 2,337,439 | Anderson | Dec. 21, 1943 |
| 2,363,771 | Bergholm | Nov. 28, 1944 |
| 2,390,085 | Kleen | Dec. 4, 1945 |
| 2,557,573 | Sherwood | June 19, 1951 |
| 2,580,440 | Kogel | Jan. 1, 1952 |
| 2,623,366 | Edel | Dec. 30, 1952 |
| 2,649,696 | Tandberg | Aug. 25, 1953 |
| 2,670,607 | Hainsworth | Mar. 2, 1954 |
| 2,672,737 | Kogel | Mar. 23, 1954 |